United States Patent [19]

Picone

[11] 4,345,927

[45] Aug. 24, 1982

[54] APPARATUS AND PROCESS FOR USE PREPARING A CONTINUOUS STRAND MAT

[75] Inventor: Charles E. Picone, Lower Burrell, Pa.

[73] Assignee: PPG Industries, Inc., Pittsburgh, Pa.

[21] Appl. No.: 221,740

[22] Filed: Dec. 31, 1980

[51] Int. Cl.³ .............................................. C03B 37/02
[52] U.S. Cl. ............................................. 65/4.4; 65/9; 65/11.1; 156/167; 156/181
[58] Field of Search ........................ 65/4.4, 9, 2, 11.1; 156/167, 181

[56] References Cited

U.S. PATENT DOCUMENTS

| | | | |
|---|---|---|---|
| 2,638,146 | 1/1949 | Rounseville et al. | 154/1.76 |
| 2,886,877 | 5/1959 | Frickert et al. | 28/1 |
| 2,981,999 | 5/1961 | Russell | 65/9 X |
| 3,105,349 | 10/1963 | Palm et al. | 57/34 |
| 3,118,269 | 1/1964 | Bilsky | 57/34 |
| 3,127,729 | 4/1964 | Head | 57/34 |
| 3,144,687 | 8/1964 | Skalko et al. | 19/145.5 |
| 3,144,747 | 8/1964 | Palm et al. | 57/34 |
| 3,236,616 | 2/1966 | Stalego et al. | 65/0.5 |
| 3,393,985 | 7/1968 | Langlois et al. | 65/9 |
| 3,511,625 | 5/1970 | Pitt | 65/11.1 X |
| 3,653,861 | 4/1972 | Stalego et al. | 65/16 |
| 3,798,100 | 3/1974 | Marchadier et al. | 156/167 |
| 3,844,191 | 10/1974 | Sears et al. | 83/420 |
| 3,850,723 | 11/1974 | Ackley | 156/180 |
| 3,883,333 | 5/1975 | Ackley | 65/2 |
| 3,915,681 | 10/1975 | Ackley | 65/9 |
| 3,930,602 | 1/1976 | Vorobiev et al. | 226/91 |
| 4,052,182 | 10/1977 | Stalego et al. | 65/3 C |

*Primary Examiner*—Robert L. Lindsay, Jr.
*Attorney, Agent, or Firm*—Kenneth J. Stachel

[57] ABSTRACT

An apparatus and process is provided for more random distribution of a bundle of strands into a continuous strand mat. The apparatus has a feeder for reciprocating, traversing deposition of strands onto a conveyor, where the feeder is positioned above the conveyor that moves in a direction around 90° from the direction of deposition of the strands across the conveyor. The feeder has a pulling means to pull the strands into the feeder and to deliver the strand to an accelerating means on the feeder which then increases the speed of the strands to contact a convex surface deflector attached to the feeder to dispose of the strands onto the moving conveyor. If the feeder traverses the conveyor on an axis above the conveyor the accelerating means and convex surface deflector are affixed to the feeder and move with the feeder. If the feeder is stationary but has a reciprocating traversing part, then the accelerating means and deflector move with the reciprocating traversing part.

14 Claims, 5 Drawing Figures

4,345,927

APPARATUS AND PROCESS FOR USE PREPARING A CONTINUOUS STRAND MAT

The present invention is directed to an apparatus and process for use in producing a mat comprised on continuous strands wherein the strands are delivered to make up the mat in a more random fashion.

Mats having continuous strands are manufactured by the deposition of continuous strands of material such as glass fibers onto a foraminous conveyor or collection surface. The strands are usually deposited onto the conveyor by a plurality of feeders dispersing the strands across the conveyor. The strands falling onto the conveyor to form the mat are deposited in overall sinuous configuration with laterally adjacent strands overlapping one another. In a mat of this character the individual strands are intermingled and overlapping with a certain orientation, but it is necessary to have the strands in a more random pattern rather than in an oriented pattern. The orientation of strands in the mat may be caused by some adherence between the individual filaments in the strand or between the strands as they are being processed and deposited onto the conveyor.

The art has tried to produce a more integral mass of strands by impinging or bouncing the strands off a deflecting surface to provide a fluffy or fuzzy property. This procedure is conducted by moving the strand at a relatively high speed directing it against a hard surface so it contacts the surface with a driving force and glances or bounces off the surface to produce the fluffy or fuzzy product. This fluffiness or fuzziness is a desired characteristic when producing a specialty yarn, but should be avoided when producing a mat of continuous strand. The fluffiness or fuzziness can reduce the strength of the particular strand that is fluffed or fuzzed. The reduction of strength would affect the integrity of the mat produced from the continuous glass fiber strand.

Recently a process has been described for producing a needled glass strand mat in which continuous glass strands are laid down on a moving conveyor with a plurality of feeders that traverse the width of the conveyor. The mat after its formation on the conveyor, is passed through a needler to impart mechanical integrity to the mat by puncturing the strand mat with a multiplicity of rapidly reciprocating barbed needles. The mat prepared in this manner has found particular utility in the preparation of stampable, fiber glass reinforced, thermoplastic resin sheets.

In the production of the needled glass strand mat as well as other continuous glass strand mats, the strand or bundled strands being fed to the conveyor may have a tendency to adhere to one another thereby limiting the random deposition of the strands on the conveyor.

It is an object of the present invention to provide an apparatus and process to increase the random dispersement of strands coming from a feeder to deposit the strands across a moving conveyor.

It is an additional object of the present invention to provide an apparatus and process to sufficiently disperse bundles of strands coming from a feeder to deposit the strands across a conveyor moving in a direction perpendicular to the direction at which the strands are being dispersed.

SUMMARY OF THE INVENTION

These and other objects are accomplished by a feeder attached to an axis, where the feeder has a strand pulling means, strand accelerating means, and a convex surface deflector to deflect the one or more strands onto a moving conveyor. The feeder has the strand pulling means to move one or more strands from supply packages of strand or bundles of strands to a position for deposition onto a moving conveyor. The feeder also has a strand accelerating means positioned on the feeder to receive the one or more strands from the strand pulling means and to direct the one or more strands onto the convex surface of the convex surface deflector. The one or more strands contacting or impinging the convex surface fall to the moving conveyor in a more random fashion. In the broad aspects of the present invention the pulling means can be any one or a series of rollers or bearing devices to supply the one or more strands from their source to a position over the moving conveyor. The strand accelerating means is located directly or obliquely under the strand pulling means and spaced apart from the rollers to receive the one or more strands. The strand accelerating means can be a roller or series of rollers or gas or liquid nozzles to accelerate the strand or stands by contacting with a gas or liquid. Spaced apart from the strand accelerating means at a distance such that not too much of the acceleration of the strands is lost is the convex surface deflector, which is attached to the feeder or in close proximity thereto. The convex surface may be circular, elliptical, rectangular or triangular or any other planar configuration conducive to being formed into a convex surface. The convex surface deflector can also be of any three dimensional configurations that provide a convex surface to be contacted by the strand or strands.

The accelerating means and convex surface deflector are connected to the feeder under the strand pulling means in such a manner that the accelerating means and deflector reciprocatingly traverse the moving conveyor. If the strand pulling means is attached to a feeder frame that traverses on an axis across the moving conveyor, then the accelerating means and deflector are affixed to the moving feeder or frame. If the feeder frame is permanently affixed to an axis over the conveyor and has reciprocating parts to traversely disperse the strands across the moving conveyor, then the accelerating means and deflector are attached to the moving part to move in conjunction with that part.

The foregoing objects are also accomplished by the process of the present invention which comprises removing glass fiber strand or strands from their supply packages to a position over a moving conveyor belt, moving the one or more strands across the width of the moving conveyor belt in a reciprocating motion, accelerating the strand or strands to a faster speed, directing the strand or strands to a convex surface deflector for deposition onto the moving conveyor.

The apparatus and process and mat product produced by the process of the present invention enable the one or more strands making up the mat to be deposited onto the mat in a more random manner, thereby reducing orientation of the one or more strands in the mat. A reduction in orientation gives a higher integrity mat. The apparatus, process and mat of the present invention is especially useful when a bundle of untwisted strands is being used to form the continuous strand mat. The convex deflector increases the separation of one strand from another in the bundle for deposition on to the moving conveyor.

DETAILED DESCRIPTION OF THE DRAWINGS

Figure 1:
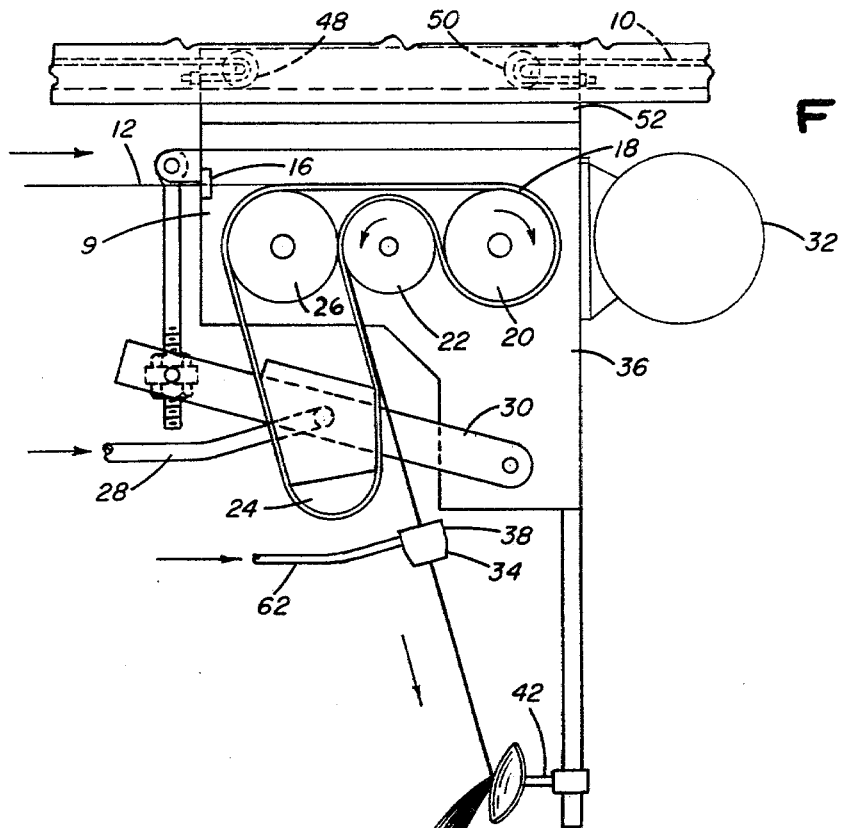
FIG. 1 is an enlarged view of a reciprocating traversing feeder releasing one or more strands to a strand accelerating means such as a transvector air jet for direction to a convex surface for deflection onto a moving conveyor.

In FIG. 1 there is shown a feeder device on an axis 10 to depose one or more strands 12 onto conveyor 14. The feeder is preferably a traversing feeder moving along axis 10 in a reciprocating movement, but the feeder can also be a stationary feeder affixed to axis 10 where the feeder has a reciprocating head or nozzle to deposit the strands onto the conveyor. In addition the feeder can also be a pendulum type feeder affixed to axis 10 but swaying in reciprocating motion across the conveyor. Also the feeder can be an attenuator for forming glass fibers from a bushing in a glass batch melting furnace. One or more strands 12 enter the feeder device by guide 16 and ride on belt 18 which curves around and under roll 20 and up over roll 22 then down, preferably at an oblique angle to the horizontal entry of strand 12 onto belt 18. The glass fiber strands are continuous glass fiber strands in the form of unstranded filaments, stranded glass filaments, untwisted bundles of stranded glass filaments including twistless roving all hereinafter referred to as glass fiber strands or strand.

The belt then continues around roll 24, which is preferably an air bearing block, and up to roll 26 and into the horizontal position to receive a different section of the strand. When the air bearing block is used for roll 24, an air supply is provided to the air bearing block by conduit 28. The tension of the belt is controlled by the belt tension channel 30, and the drive means to drive the belt is supplied by motor 32 by a driving assembly (not shown) connected to any of the rolls and preferably roll 22.

The strand 12 leaves the feeder rolls before the belt curves around roll 24 and continues to its horizontal position. The strand is directed to and enters the accelerating means 34 which is attached to the feeder frame 36 by brace 38. This accelerating means can be any means such as rollers, gas or liquid ejecting devices to increase the speed of the strand leaving the feeder rolls. The preferred accelerating means is a transvector air jet such as that manufactured by Vortec Corp. It is preferred to have the strand leave the feeder at an angle to the extended direction of the belt leaving roll 22 where the belt travels from roll 22 and returns to roll 26 in a perpendicular direction to the horizontal direction that the belt travels on top of rolls 26, 22 and 20. This is accomplished by placing roll 24 directly beneath roll 26. This angle varies from 0° to around 45° with the preferred angle being around 40°. The transvector jet has a strand passing through the center of the jet with air provided to the jet in a lateral fashion to surround the strand with columns of air and increase the speed of the strand. The air enters the transvector air jet by air conduit 62 coming from a pressurized air source.

As the strand leaves the transvector jet at a higher speed, it contacts the convex surface deflector 40 spaced apart from the transvector jet. The distance the deflector is located from the transvector jet is not critical but the deflector should be located at a distance from the jet to allow the strand to contact the deflector at a speed faster than the strand speed leaving the feeder without the use of the transvector air device. The convex surface deflector is preferably tapered at its distal end from the point of contact by the strands. The deflector 40 is attached to the frame 36 by any attaching device such as a rod 42. It is preferred not to have any angle in the strand between the transvector air jet and the deflector. Therefore, since the transvector air jet and the deflector are located at a spaced apart distance from one another and the strand does not make an angle during its travel from the transvector air jet to the deflector, the jet and the deflector can have the same attaching means to frame 36. As the strands contact the convex surface of the deflector at the higher speeds, the bundle of strands become dissociated allowing the strands to disperse from the bundle of strands into individual strands or groups of strands and fall onto the conveyor belt 44.

The glass fiber strand 12 is deposited on conveyor belt 44 across the width of the belt preferably in a direction perpendicular to the path of travel of the belt 44 as the feeder travels along axis 10 or as the strand is fed across the belt. Preferably the feeder travels along axis 10 by wheels 48 and 50 located in the carriage portion 52 of the feeder. The glass fiber strands 54 so deposited form a mat 56 which may be used for reinforcement of resinous material. The mat 56 has reduced orientation of the deposited glass fiber strands due to the deflection of the bundle of strands by the deflector with a convex surface, deflector 40. The conveyor belt 44 is supported by roll 58 which is driven by the shaft 60. The shaft 60 is driven by a motor (not shown) which provides constant uniform motion of the conveyor belt 44. The axis 10 is positioned over the conveyor belt 44 by support members (not shown) on both sides of the conveyor.

Thus a feeder for reciprocatingly dispersing strand, preferably the traversing reciprocating feeder, along with the transvector air jet and convex surface deflector of the present invention provides for the uniform deposition with reduced orientation of the glass fiber strand or bundled glass fiber strands into a uniform mat 56 supported by belt 44 which is traveling in a direction perpendicular to the path of traverse of the feeder or attenuator 9 or of the reciprocating dispersed strand.

Figure 2:
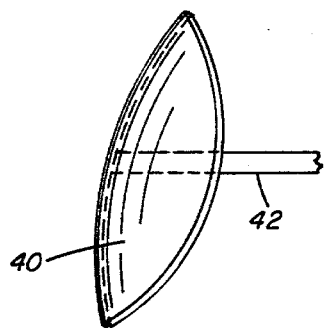
FIG. 2 is an enlarged side view of the convex surface.

FIG. 2 shows an enlarged side view of the convex surface deflector 40 attached to connecting member 42 for mounting on the feeder beneath the transvector air jet.

Figure 3:
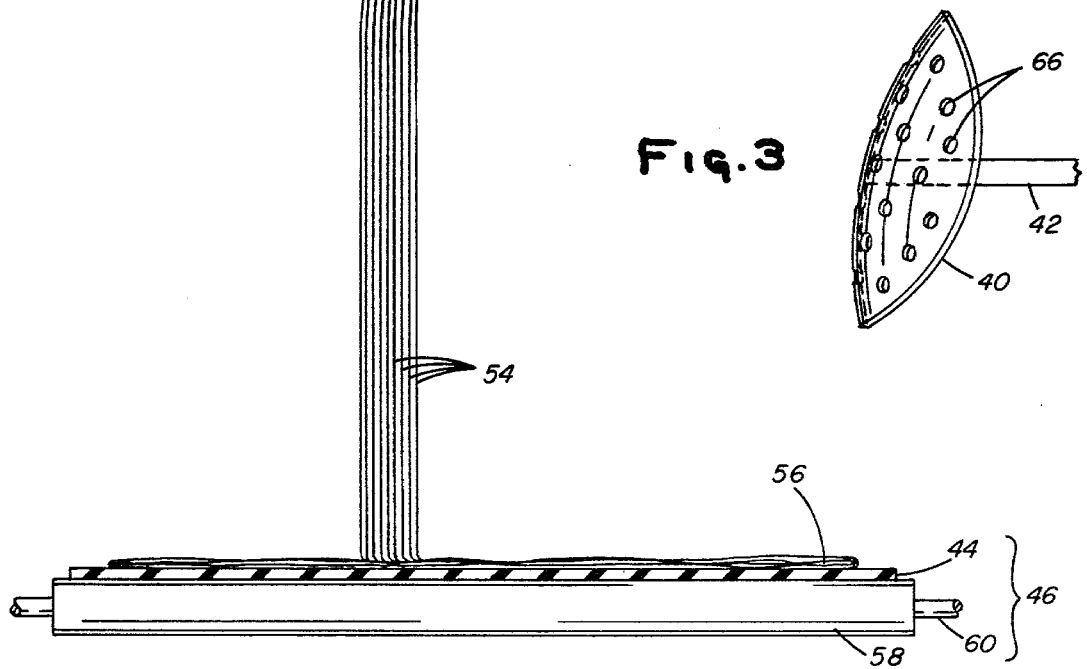
FIG. 3 is an enlarged side view of the convex surface having a multiplicity of holes.

FIG. 3 shows an alternative embodiment of the convex surface deflector. Here the side view of convex surface deflector 40 has numerous apertures 66. For a convex surface that is not tapered, chemical treating agent on the strand may tend to build up on the convex surface. The apertures are provided preferably for a nontapered convex surface although a tapered convex surface can also have apertures to reduce the buildup of chemical treating agent. The convex deflector with apertures is attached to connecting member 42 for attachment to the feeder frame 46.

Figure 4:
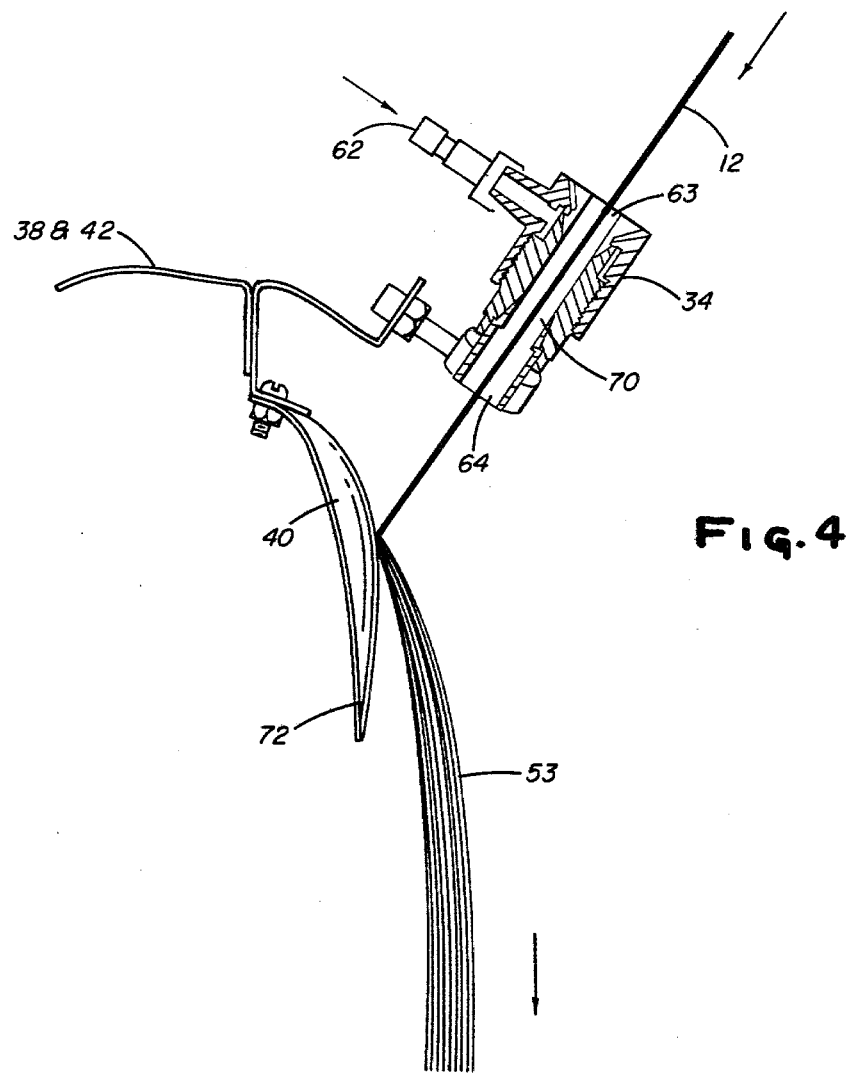
FIG. 4 is an enlarged view of the accelerating means and the tapered convex surface deflector.

FIG. 4, shows an enlarged view of the transvector air jet and the tapered convex surface deflector with a cut away view of the transvector jet. The tapered convex surface 40 shares a connecting member to the feeder frame with the transvector air jet, 34. The tapered convex surface deflector is attached to the transvector jet by brace 38 and connecting member 42. The transvector jet receives the strands from the feeder at an angle. The strands 12 enter the transvector air jet at opening 63. These strands pass through this opening into the cylindrical chamber of the transvector air jet and are contacted by air. Air from the pressurized air supply is provided to the transvector air jet by conduit 62. The air flows into the cylindrical chamber, 70, of the transvector jet and surrounds the strands and increases the speed of the strands exiting the transvector jet at opening 64 along with the air. The strand or bundle of strands 12 exiting the transvector jet contact the tapered convex surface of the deflector 40 and are deflected as separated strands or groups of strands, 53, to the conveyor belt (not shown in FIG. 4). If there is any chemical treating agents on the fibers as they contact the tapered convex surface of the deflector, any residue of the chemical treating agent that is removable from the strands will usually build up on the top surface of the tapered convex surface. This buildup does not interfere with the strands contacting the tapered convex surface.

Figure 5:
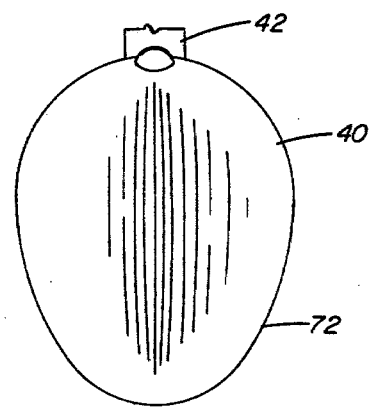
FIG. 5 is an enlarged frontal view of the tapered convex surface deflector.

In FIG. 5 there is shown a frontal view of the convex surface deflector 40 with its tapered end 72 and mounting attachment 42. This deflector is the preferred deflector of the present invention.

FIG. 4 shows the preferred transvector air jet and convex surface deflector combination of the present invention. Also it is preferred that the feeder is a traversing reciprocating feeder of FIG. 1 but with roll 24 located directly beneath roll 26. Also it is preferred that the strands are supplied from twistless roving packages of glass fiber strands.

The description of FIGS. 1–5, elucidating the apparatus and process of the present invention and the explanation of the operation of this apparatus and process, is descriptive of a reciprocating feeding mechanism having particular utility in the area of traversing bundles of glass fiber strands from roving packages across a conveyor to form a substantially uniform continuous glass fiber strand mat. Preferably a reciprocating traversing mechanism along with the transvector air jet and convex surface deflector produces a continuous glass fiber strand mat with less orientation than conventional continuous glass fiber strand mat.

I claim:

1. A feeding apparatus for attachment to an axis over a moving conveyor for reciprocatingly feeding a bundle of strands across the moving conveyor to form a mat, comprising:
   a. a frame mounted to said axis,
   b. puller means mounted on said frame to pull the bundle of strands into the feeder for reciprocating disposition onto said moving conveyor,
   c. accelerating means attached to the feeder frame to receive the bundle of strands from the puller means, and increase the strand speed over that speed given the strands by the puller means, and
   d. a deflector means with convex surface mounted to said frame and spaced apart from the accelerating means to deflect the bundle of strand contacting the convex surface of the deflector after exiting the accelerating means so that the bundle of strands is separated into strands or more than one group of strands that are disposed on to said movable conveyor in a more random pattern to form a mat.

2. The apparatus of claim 1 wherein the accelerating means is mounted on to the feeder frame to receive the strand from the puller means at an angle from which the bundle of strands leaves the puller means.

3. Apparatus of claim 2 wherein the accelerating means and deflector means are spaced apart and mounted on the frame so that the strand entering the accelerating means at an angle from the puller means contacts the convex surface of the deflector after traveling linearly through the spaced part distance between the accelerating means and the deflector means.

4. Apparatus of claims 1 or 2 where the convex surface is tapered at its distal end from the point of contact with the strands.

5. Apparatus of claim 1 wherein the puller means comprises:
   a. a first roller connected to the feeder frame,
   b. a second roller connected to said frame and powered by a motor,
   c. a third roller connected to said frame linearly from said second roller,
   d. a fourth roller located linearly below the first roller, and
   e. a belt riding on the first roller, over the second roller, around the third roller under the third roller, up onto the second roller, and down around the fourth roller.

6. Apparatus of claim 5 wherein the fourth roller is an air bearing block with an air supply.

7. Apparatus of claims 1 or 2 wherein the deflector means with convex surface has a plurality of apertures.

8. Apparatus of claim 1 wherein the attachment to the axis allows the feeder apparatus to move along the axis to traverse the conveyor in a reciprocating movement.

9. Process for separating a bundle of strands into more than one group of strands to fall onto a moving conveyor to form a continuous strand mat comprising:
   a. pulling the bundle of strands through a feeder for deposition onto the moving conveyor,
   b. accelerating the bundle of strands from the feeder through an accelerating means to increase the strand speed over that speed given the strands by the puller means, and
   c. deflecting the bundle of strands on a convex surface onto a moving conveyor to produce the mat.

10. Apparatus of claim 1 or process of claim 9 wherein the accelerating means is a transvector air jet.

11. Apparatus for use on a reciprocating traversing feeder of strands whereby the strands are fed onto a moving conveyor as the traversing feeder moves across the moving conveyor, the strands exiting the feeder having:
   a. a transvector air jet, and
   b. a deflector means with a convex surface spaced apart from said vortec jet to receive strands which exit the jet in a direction over the moving conveyor ranging from perpendicular to the moving conveyor to parallel to the moving conveyor and to dispose the deflected strands onto the moving conveyor.

12. Apparatus of claim 2 wherein the angle is in the range of from 0° to about 45°.

13. Apparatus of claim 3 wherein the accelerating means and deflector means are separated apart a sufficient distance to allow the strand to contact the deflector means at a speed faster than the strand speed leaving the feeder.

14. Apparatus of claim 1 wherein the accelerating means is a gas or liquid ejecting device to increase the speed of the strand leaving the puller means.

* * * * *

UNITED STATES PATENT AND TRADEMARK OFFICE
CERTIFICATE OF CORRECTION

PATENT NO. : 4,345,927
DATED : August 24, 1982
INVENTOR(S) : Charles E. Picone

It is certified that error appears in the above-identified patent and that said Letters Patent are hereby corrected as shown below:

Column 5, line 57, Claim 1, subparagraph b., last line, should read --cating deposition onto said moving conveyor,--

Signed and Sealed this

Nineteenth Day of October 1982

[SEAL]

Attest:

GERALD J. MOSSINGHOFF

Attesting Officer

Commissioner of Patents and Trademarks